United States Patent
Schmidt

(10) Patent No.: US 9,694,425 B2
(45) Date of Patent: Jul. 4, 2017

(54) BUSHING ALIGNMENT DEVICE FOR A BAR LOADING MAGAZINE AND METHOD

(75) Inventor: Falk Schmidt, Külsheim (DE)

(73) Assignee: FMB MASCHINENBAUGESELLSCHAFT MBH & CO. KG (DE)

( * ) Notice: Subject to any disclaimer, the term of this patent is extended or adjusted under 35 U.S.C. 154(b) by 0 days.

(21) Appl. No.: 14/007,724

(22) PCT Filed: Mar. 28, 2012

(86) PCT No.: PCT/EP2012/001358
§ 371 (c)(1),
(2), (4) Date: Jan. 9, 2014

(87) PCT Pub. No.: WO2012/130444
PCT Pub. Date: Oct. 4, 2012

(65) Prior Publication Data
US 2014/0109733 A1    Apr. 24, 2014

(30) Foreign Application Priority Data

Mar. 30, 2011   (DE) .................. 10 2011 015 578

(51) Int. Cl.
*B23B 13/10* (2006.01)
*B23B 13/12* (2006.01)
(Continued)

(52) U.S. Cl.
CPC .............. *B23B 13/12* (2013.01); *B23B 13/00* (2013.01); *B23B 13/02* (2013.01); *B23B 13/10* (2013.01);
(Continued)

(58) Field of Classification Search
CPC ......... B23B 13/00; B23B 13/10; B23B 13/12; B23B 13/126; B23B 13/02
(Continued)

(56) References Cited

U.S. PATENT DOCUMENTS 3,602,075 A    8/1971   Waefler
3,680,415 A    8/1972   Takano et al.
(Continued)

FOREIGN PATENT DOCUMENTS

CH    490141 A       5/1970
DE    2025460 A1    12/1970
(Continued)

OTHER PUBLICATIONS

International Search Report and Written Opinion for corresponding PCT Application No. PCT/EP201/001358, mail date May 15, 2012 (20 pages).
(Continued)

*Primary Examiner* — Sara Addisu
(74) *Attorney, Agent, or Firm* — Baer Crossey McDemus LLC; Kevin M. Drucker, Esq.; David L. Cargille, Esq.

(57) ABSTRACT

The present invention relates to a socket alignment device for a bar loading magazine for guiding a bar of material to an automatic lathe, wherein a z-axis (z) is defined by the longitudinal axis of a bar of material (2) guided in the bar loading magazine, and wherein a first socket (1), into which the bar of material (2) is to be introduced for processing thereof in the automatic lathe along the z-axis, is arranged in the bar loading magazine, wherein the first socket (1) is mounted so as to be rotatable either coaxially about the z-axis (z) or about a rotational axis (ζ') parallel to the z-axis (z) and wherein at least one drive means (6) is included, which can be coupled at least to the first socket (1), specifically to the rotary drive of the first socket (1) about the z-axis (z) in such a manner that the first socket (1) and the cross-sectional profile of the bar of material (2) can be aligned flush with one another for introduction of the bar of material (2).

13 Claims, 11 Drawing Sheets

Figure 1A:
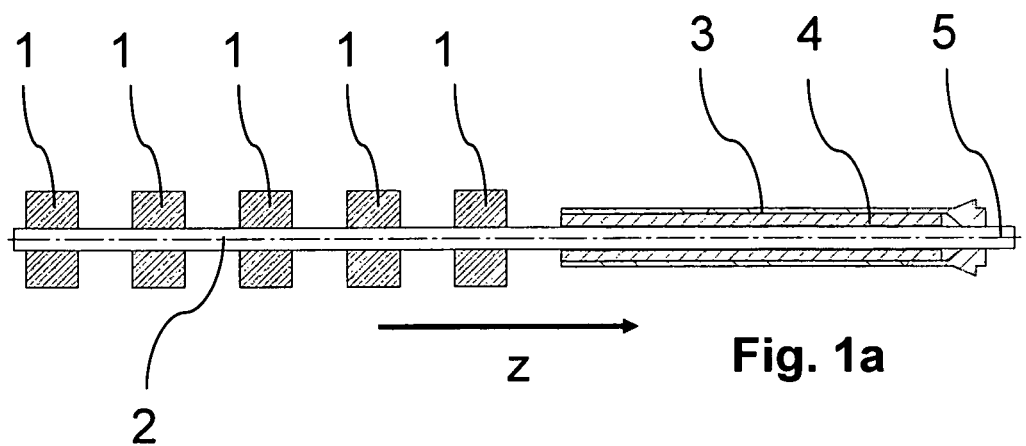

(51) Int. Cl.
*B23B 13/00* (2006.01)
*B23B 13/02* (2006.01)

(52) U.S. Cl.
CPC ............ *B23B 13/126* (2013.01); *Y10T 82/10* (2015.01); *Y10T 82/2518* (2015.01)

(58) Field of Classification Search
USPC .................. 82/124–127; 29/464, 37 R, 37 A
See application file for complete search history.

(56) References Cited

U.S. PATENT DOCUMENTS

| | | | | |
|---|---|---|---|---|
| 4,058,036 A | * | 11/1977 | Austin | 82/163 |
| 4,258,571 A | * | 3/1981 | Jurgens et al. | 73/864.31 |
| 5,066,185 A | * | 11/1991 | Cucchi | 414/18 |
| 5,115,702 A | * | 5/1992 | Link | 82/126 |
| 5,320,008 A | * | 6/1994 | Cucchi | 82/126 |
| 5,456,146 A | * | 10/1995 | Hubbard et al. | 82/127 |
| 5,520,493 A | * | 5/1996 | Cucchi | 414/18 |
| 5,655,278 A | * | 8/1997 | Harmand | 29/33 R |
| 5,911,804 A | * | 6/1999 | Haller et al. | 82/127 |
| 5,916,344 A | | 6/1999 | Cucchi | |
| 6,098,509 A | * | 8/2000 | Drei et al. | 82/127 |
| 6,189,424 B1 | * | 2/2001 | Wheeling et al. | 82/1.11 |
| 6,302,003 B1 | | 10/2001 | Haller et al. | |
| 6,575,063 B1 | * | 6/2003 | Inaba | 82/127 |
| 6,598,884 B1 | * | 7/2003 | McCluskey et al. | 279/51 |
| 8,161,852 B2 | * | 4/2012 | Casalini et al. | 82/127 |
| 2007/0157774 A1 | * | 7/2007 | Gross et al. | 82/117 |
| 2012/0090436 A1 | * | 4/2012 | Schmidt et al. | 82/126 |

FOREIGN PATENT DOCUMENTS

| | | |
|---|---|---|
| DE | 4000598 C1 | 4/1991 |
| DE | 69809356 T2 | 4/2003 |
| EP | 0475152 A2 | 3/1992 |
| EP | 0850714 A1 | 7/1998 |
| JP | 05318206 A * | 12/1993 |

OTHER PUBLICATIONS

German Office Action for DE 201115578.3 dated Nov. 28, 2013 (5 pages).
International Preliminary Report on Patentability for corresponding PCT Application No. PCT/EP201/001358, mail date Jul. 30, 2012 (20 pages).
English Translation of the German Office Action for DE 201115578.3 dated Nov. 28, 2013 (5 pages).

* cited by examiner

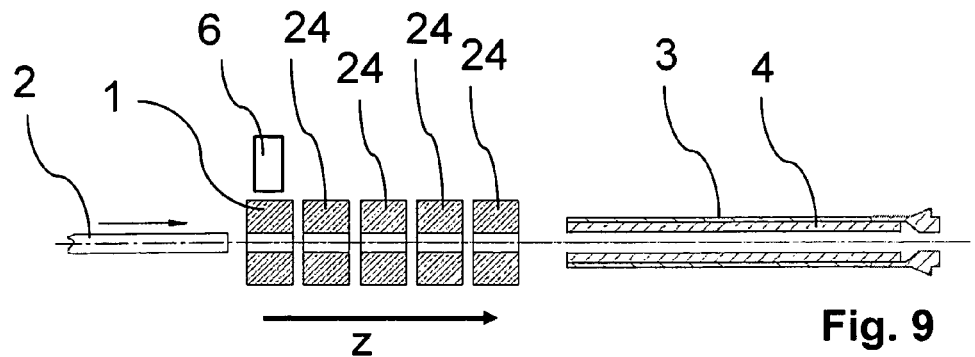
Fig. 9
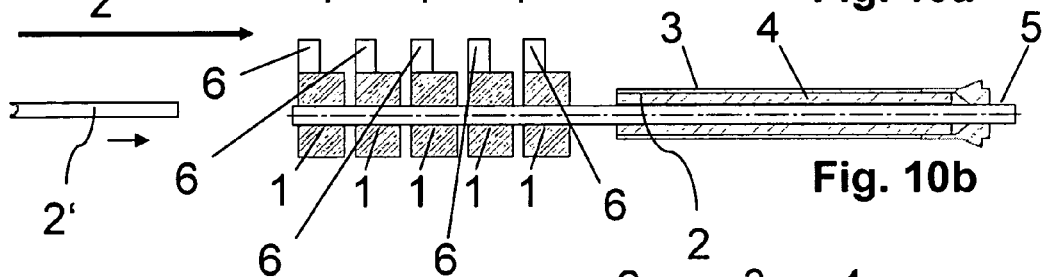
Fig. 10a
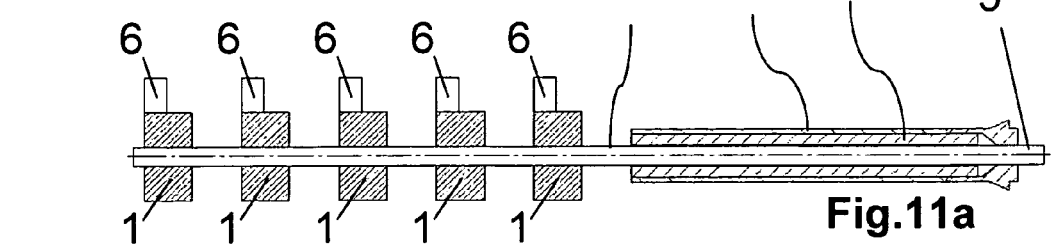
Fig. 10b
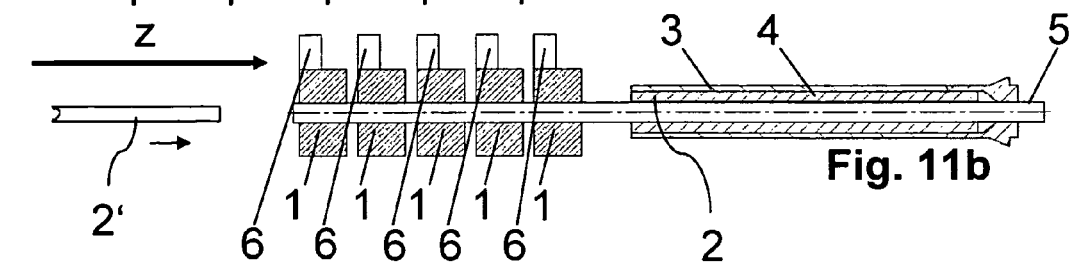
Fig. 11a
Fig. 11b

BUSHING ALIGNMENT DEVICE FOR A BAR LOADING MAGAZINE AND METHOD

The present invention relates to a bushing alignment device of a bar loading magazine for guiding material bars on an automatic lathe having one or more spindles or similar machine tools, wherein the invention is not limited to particular loading magazines or automatic lathes, but may be employed in all types of bar loading magazines to guide at least one material bar to automatic lathes or similar machine tools.

Automatic lathes for machining bar-shaped semi-finished products, which hereafter is referred to as material bars, are known in principle and usually comprise a fixed or displaceable headstock, in which one or more spindles driven by a drive unit are mounted along a z-axis. In the processing chamber of the automatic lathe, the material bar that is clamped into the spindle of the automatic lathe is worked with the aid of a tool. For this purpose, the material bar is usually inserted from the headstock rear of the automatic lathe into the rotatable spindle thereof designed as a hollow shaft and tightened therein with the aid of a chuck for processing purposes.

Bar loading magazines, which are also referred to as loading magazines or bar loaders, are likewise basically known and allow material bars to be guided on these automatic lathes. The respective bar loading magazine provided on an automatic lathe must guide the material bar as precisely as possible during the entire processing operation so as to avoid vibrations and oscillations on the automatic lathe and the bar loading magazine.

In the avoidance of oscillations or vibrations, notably the support of the material bar in the bar loading magazine is particularly important, wherein different requirements with regard to the dimensions and geometries of the material bars must be considered. For example, the material bars have lengths of up to 6 meters and diameters between 1 and 100 mm. Moreover, material bars can have a wide variety of cross-sectional profiles, wherein a distinction must be made between symmetrical and non-symmetrical cross-sectional profiles.

On the other hand, the guidance of the material bars in the bar loading magazine must assure a wide variety of requirements so as to enable an economical and productive manufacturing process. In this respect, especially high processing speeds of the material bars to be processed by turning of up to 15000 revolutions per minute, and the alignment thereof in the lathe spindle of the automatic lathe, must be included. For material bars to be processed by turning, centric or also eccentric clamping in the lathe spindle of the automatic lathe is possible, for which reason imbalances may occur due to uneven mass distribution about the rotational or longitudinal axes of the material bars, and for which reason high requirements must be satisfied by the guidance of the bar loading magazines so as to be able to adhere to the necessary manufacturing tolerances.

In order to meet these different requirements in regard to supporting and guiding material bars in bar loading magazines, what are known as bushing units were developed, which can usually be displaced in the bar loading magazine along the z-axis and which, for supporting and guiding the material bars, are equipped with bushings in which the material bars can be inserted in the longitudinal direction.

These bushings are rotatably mounted within a bushing unit, wherein usually several bushing units are positioned at uniform distances along the longitudinal axis of the material bar so as to be able to avoid vibrations to the greatest extent possible. A respective cylindrical material bar to be guided is slidingly supported in a cylindrical opening of the bushing during the processing operation in the automatic lathe in such a way that the material bar is safely guided on the provided automatic lathe.

So as to improve the manufacturing precision even further, bushings having a profiled opening have been developed over the past years for these bushing units, this opening corresponding to a cross-sectional profile of material bars, so that the material bars are seated in the profiled openings of these bushings with positive fit, and may thus be guided with even more precision in the bar loading magazine with respect to radial imbalances.

These bushings having profiled openings can be appropriately replaced, so that these can be adapted to the application in question, which is to say, to the cross-sectional profile in question of the profiled material bar, or to the cylindrical profile of a material bar to be eccentrically supported, by inserting bushings having the appropriate profiled openings and/or having profiled openings arranged eccentrically with respect to the rotational axis of the bushing into the bushing unit.

So as to enable a material bar to be inserted into a bushing that is provided with a profiled opening, this bushing must be moved into an appropriate rotational position in the bar loading magazine prior to the processing operation using the automatic lathe, so that the profiled opening of the bushing is aligned flush with the cross-sectional profile of the material bar and this can subsequently be axially inserted into the bushing.

In principle, it is also possible to align the bushings in an appropriately flush rotational position by manually rotating them. However, such a manually guided loading operation of bar loading magazines requires a very high time expenditure, which is accompanied by decreased productivity during the machining or processing of profiled material bars or those to be processed eccentrically.

OBJECT

Against this background, it is the object of the present invention to further increase the degree of automation of bar loading magazines, and in particular to design the insertion of profiled material bars, or material bars to be processed eccentrically, into the guidance of bar loading magazines more efficiently.

This object is achieved by the subject matter of the independent device claim and method claim.

Preferred and/or advantageous embodiments and refinements are the subject matter of the respective subordinate claims.

According to the invention, this is achieved by a bushing alignment device of a bar loading magazine for guiding material bars on an automatic lathe, wherein a z-axis is defined by the longitudinal axis of a material bar guided in the bar loading device, and wherein at least one first bushing, into which the material bar is to be inserted for processing thereof in the automatic lathe along the z-axis, is arranged in the bar loading magazine, wherein the first bushing is mounted either coaxially rotatably about the z-axis or about a rotational axis parallel to the z-axis, which is to say the rotational axis extending through the first bushing is arranged either coaxially or parallel to the z-axis. Moreover, at least one drive means is included, which can be coupled at least to the first bushing, and more particularly for rotatorily driving the first bushing about the rotational axis in such a way that the first bushing and the cross-sectional profile of the material bar can be aligned flush with each other for inserting the material bar.

The invention thus makes it possible for the rotational positions of the bushings for supporting and guiding material bars in a bar loading magazine to be varied by a drive that is coupled to the bushings in such a way that the rotatably mounted bushing can be appropriately aligned flush with the cross-sectional profile of the material bar.

As a result, compared to the prior art, the invention enables material bars to be automatically inserted into the bushings of a bar loading magazine along the longitudinal axes, and further it enables efficient processing of profiled material bars and/or material bars to be processed eccentrically on automatic lathes, while achieving high guiding precision of the material bars. The invention additionally enables the efficient use of bushings having a profiled and/or eccentrically arranged profiled opening and, as a result, high processing speeds.

It shall further be mentioned that hereafter the term 'bushing', and hereafter also the term of a first and second bushing, shall be understood to mean any supporting and/or guiding means that is able to support a material bar to be inserted therein with respect to the radial alignment thereof and to guide this bar along the longitudinal direction thereof, wherein such a bushing allows a rotational movement of the material bar to be supported or guided about the longitudinal axis thereof as well as an axial movement of the material bar. Such a bushing is in particular provided with a cylindrical borehole and/or a profiled opening, which allows a material bar to be inserted in the longitudinal direction and slideably supported. In particular plastic is a suitable material for such a bushing, wherein metals or ceramics also being possible.

Moreover, the bushing is arranged in the bar loading magazine rotatably about a rotational axis, wherein a z-axis is defined by the longitudinal axis of the material bar, the z-axis coinciding with the rotational axis in the case of bushings having a profiled opening arranged centrically with respect to the rotational axis of the bushing. If the profiled opening of the bushing is arranged eccentrically with respect to the rotational axis thereof, the rotational axis is aligned parallel to the z-axis or the longitudinal axis of the material bar.

In a preferred embodiment of the invention, a bushing is arranged in a bushing rack rotatably about a rotational axis aligned in the z-axis, and in particular is mounted in a ball, rolling or sliding bearing. Within the meaning of the invention, a bushing is thus also understood to mean a grouping of multiple individual bushings for inserting material bars which are arranged combined in a bushing rack and non-rotatably connected to each other, for example by way of a connecting pipe or the like. Moreover, such a bushing and/or such a bushing rack may be arranged in the bar loading magazine along the z-axis movably or immovably with respect to the material bar to be guided by the bushing.

According to the invention, all conceivable drive means are included, which are able to set bushings into rotational motion for supporting and guiding material bars in bar loading magazines and which may be coupled thereto for this purpose.

In a preferred embodiment of the invention, the coupling of the drive means to a first bushing is carried out on a circumferential surface of the first bushing, wherein the drive means may also be arranged on the end face of the first bushing or within the bushing, for example as a direct drive. Coupling is preferably understood to mean a connection of the drive means to the first bushing by force fit, friction fit or positive fit. A force transmission means, such as a friction wheel, a gear wheel, a toothed belt, a V-belt, a friction belt or the like is particularly suited for coupling the drive means.

In a preferred embodiment of the invention, a holding unit is included, which retains the first bushing in a predetermined rotational position with respect to the cross-sectional profile of the material bar for mutual flush alignment. Such a holding unit allows the first bushing to be retained with respect to the rotational position thereof, and may act in particular by positive fit, force fit, friction fit, magnetically and/or inductively.

In a preferred embodiment of the invention, this holding unit is arranged on the bushing rack and/or in the bar loading magazine and makes it possible to retain the first bushing in a predetermined rotational position. All conceivable forms of mechanical and/or electrical holdings units may be used as holdings units, for example mechanical brakes, electrical regulating units or control units of drives, or electric brakes, which can retain and/or fix the first bushing set in rotation by the drive means.

In a preferred embodiment of the invention, a position detector is arranged on the first bushing, this position detector being able to determine the rotational position of the first bushing about the rotational axis thereof and to cooperate with the holding unit. Such a position detector can be of a mechanical type, such as an engaging means, for example, which is arranged on the first bushing and engages in a receiving element arranged in the bar loading magazine, or a receiving element which is arranged on the first bushing and in which an engaging means arranged in the bar loading magazine can engage, so that the first bushing can be retained in a predetermined rotational position by the holding unit.

In an alternative embodiment of the invention, an optical and/or electric position detector, in particular in the form of an electronic coding or a pulse generator, is arranged in a predetermined rotational position of the first bushing. As an alternative, it is also possible for a sensor, which is arranged in the bar loading magazine and cooperates with the position detector, to detect the rotational position of the first bushing. The position detector and/or the sensor are connected to an evaluation unit and/or to the control unit of the bar loading magazine and cooperate with the holding unit, which in turn is able to retain the first bushing in the predetermined rotational position as detected by the position detector and/or the sensor.

According to the invention, all conceivable drive means are included, which are able to set bushings in bar loading magazine into rotational motion. In a particularly expedient embodiment of the invention, the first bushing, or also a plurality of first bushings, in the bar loading magazine is driven by a rotatorily acting motor, by a linear motor or by a actuator motor, wherein the force transmission to the bushing may be carried out directly or by way of an aid such as a drive shaft, a belt drive, a gear wheel, a toothed rack or the like.

In a particularly advantageous embodiment of the invention, the drive means can be selectively coupled to or decoupled from the first bushing, so that the drive means, in a first step, can be coupled to the first bushing and the first bushing can be set into rotational motion by the drive means. After the first bushing has been aligned flush with the cross-sectional profile of the material bar and the bar has then been inserted, in a second, subsequent step the drive means can be decoupled again from the first bushing, so that the bushing can now rotate freely and the material bar can be processed in the automatic lathe.

In an expedient embodiment of the invention, the drive means is attached to a pivoting device, which can be pivoted toward the first bushing for coupling the drive means thereto. Such a pivoting device may be arranged in the bar loading magazine or outside thereof and may be operated and/or controlled mechanically, electrically, fully automatically and/or manually. Moreover, a control unit of such a pivoting device may be electrically integrated into the control unit of the bar loading magazine and/or the automatic lathe.

In an alternative embodiment of the invention, a clutch is connected between the first bushing and the drive means for force transmission, the clutch being in particular designed to switch automatically. Such an automatically switching clutch can couple the drive means to the first bushing, or decouple the same therefrom, as a function of a particular threshold value. For example, such a clutch may be connected so as to be triggered as a function of the torque and may automatically decouple the coupling of the drive means to the first bushing when a predetermined torque present at the first bushing has been exceeded and after the holding means has retained the first bushing in a predetermined rotational position. Within the framework of the invention, it is of course also possible to use other types of clutches, for example of the rotational speed-controlled or electronically controlled type or the like.

In a particularly advantageous embodiment of the invention, the drive means and/or the first bushing are arranged in the bar loading magazine so as to move along the z-axis, so that the first bushing and/or the drive can be displaced along the z-axis and can thus be positioned in a particular location along the longitudinal axis of the material bar. It is thus possible to securely support and guide the material bar in an appropriately suited longitudinal position, and moreover to move the first bushing and/or the drive into the appropriate starting position in the bar loading magazine for insertion of a new material bar into the bar loading magazine. In an expedient embodiment of the invention, the drive means is also arranged on a bushing rack and movable together therewith along the z-axis. In a further embodiment of the invention, only the bushing rack is arranged movably along the z-axis, while the drive means is fixed relative to the z-axis.

In a further advantageous embodiment of the invention, the bar loading device comprises at least one second bushing, movable along the z-axis, which is mounted rotatably about the z-axis, or about a rotational axis that is parallel to the z-axis, and into which the material bar is to be inserted along the z-axis, wherein the first and second bushings have entrainment means designed in complementary manner to each other. A rotational axis, which is arranged either coaxially or parallel to the z-axis and about which the second bushing is rotatably mounted, thus also extends through the second bushing. The entrainment means are designed in particular in the manner of a friction surface and/or a magnetically acting surface and/or an engaging means and a receiving portion. The first and second bushings can thus be coupled to each other with friction fit and/or positive fit in such a way that a rotation of the first bushing causes the second bushing to be entrained.

In an advantageous embodiment of the invention, the entrainment means are arranged in predetermined positions on the first and second bushings, so that the entrainment of the second bushing is carried out exclusively in a particular rotational position with respect to the first or second bushing, and the first and second bushings can be aligned with each other in a predetermined rotational position so as to allow a flush alignment of the profiled openings of the first and second bushings, and consequently the insertion of a material bar into the first and second bushings.

In a particular embodiment of the invention, a plurality of first and/or second bushings, in which the material bar can be guided and supported and which can have the features of the first and/or second bushings as described above, are provided in the bar loading magazine. Moreover, a plurality of drive means and/or force transmission means are included within the framework of the invention, which can each be coupled to one or more first bushings and which likewise can be arranged movably along the z-axis or in a fixed manner.

The method according to the invention for aligning bushings is carried out by way of the above-described bushing alignment device according to the invention and, in a first step, comprises the rotatory driving of a first bushing by the drive means, wherein a force transmission means is coupled to the first bushing for this purpose. When the first bushing is set into rotational motion, in the simplest embodiment the material bar is guided axially along the z-axis close toward the first bushing, wherein the material bar is placed against the end face of the first bushing and axial pressure is applied to the material bar, while the first bushing continues to be kept in rotational motion. When the first bushing, as a result of the rotational motion, has reached a rotational position in which the first bushing, or the profiled opening thereof, is aligned flush with the cross-sectional profile of the material bar, the axial pressure applied to the material bar results in the insertion into the first bushing along the z-axis.

In a further embodiment of the invention, after the first step of the first bushing being rotatorily driven by the drive means, the first bushing is coupled to a second bushing by friction-fit and/or positive-fit entrainment of the first bushing in a particular rotational position, whereby the second bushing is likewise driven rotatorily. In a further preferred embodiment of the invention, further second bushings can be coupled to each other by entrainment means and brought into the predetermined rotational position. When the first and second bushings are set into rotational motion, the material bar is guided axially along the z-axis close toward the first bushing, wherein the material bar is placed against the end face of the first bushing and axial pressure is applied to the material bar, while the first bushing continues to be kept in rotational motion. When the bushing, as a result of the rotational motion, has reached a rotational position in which the first bushing, or the profiled opening thereof, is aligned flush with the cross-sectional profile of the material bar, the material bar is inserted into the first and second bushings along the z-axis. In a further, very preferred method of the invention, prior to the insertion of the material bar into the first bushing and/or second bushing, this material bar is first retained in a predetermined rotational position by a holding unit for the mutual flush alignment with respect to the cross-sectional profile of the material bar, and the material bar is only then inserted into the first bushing and/or second bushing.

Figure 1B:
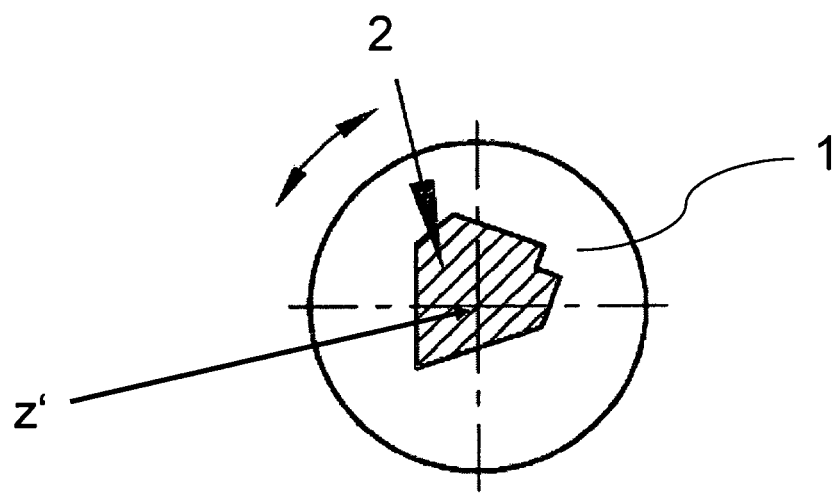
Figure 1C:
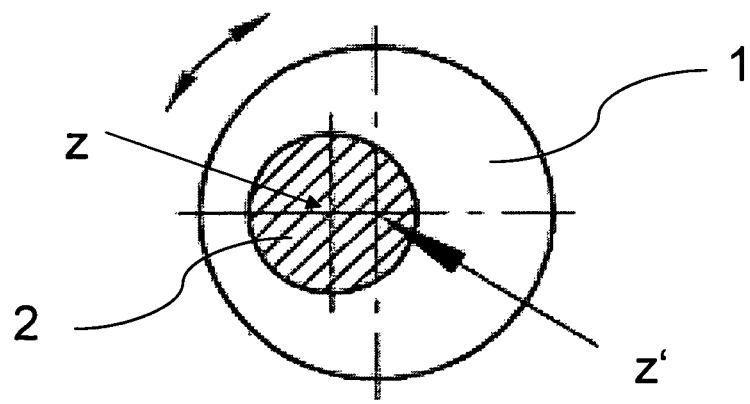
Figure 2A:
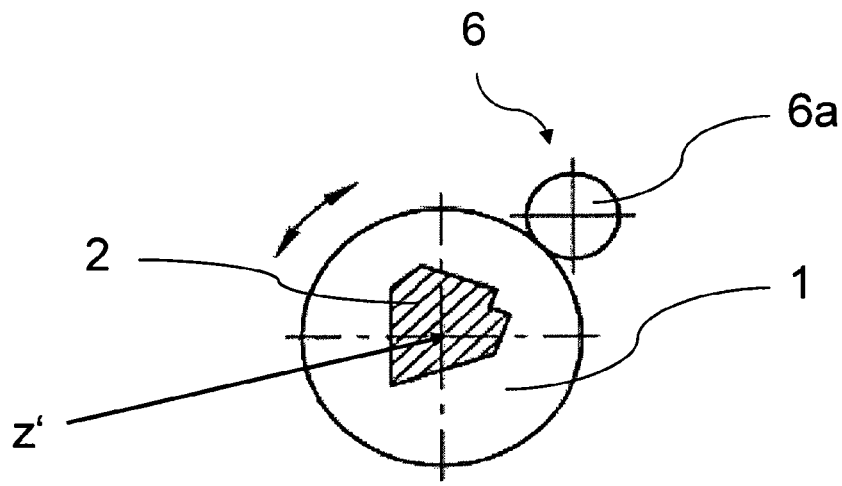
Figure 2B:
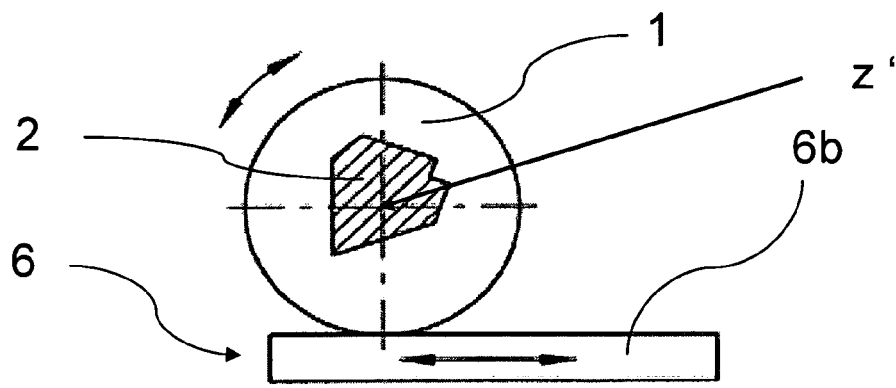
Figure 2C:
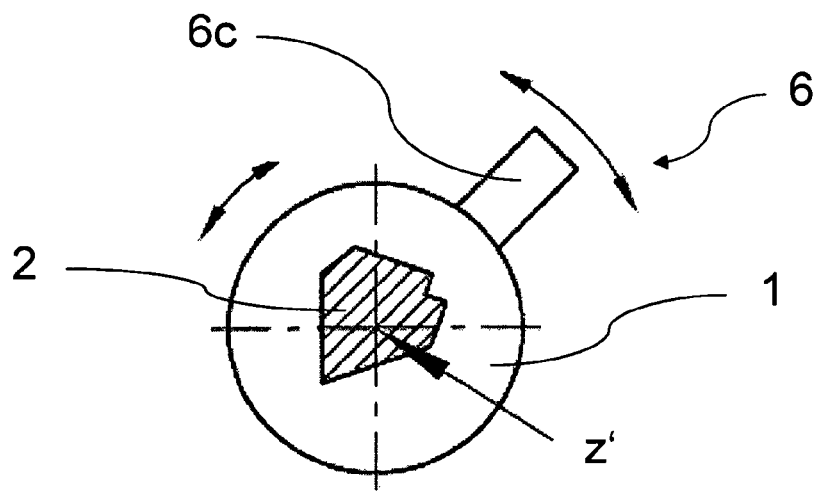
Figure 3:
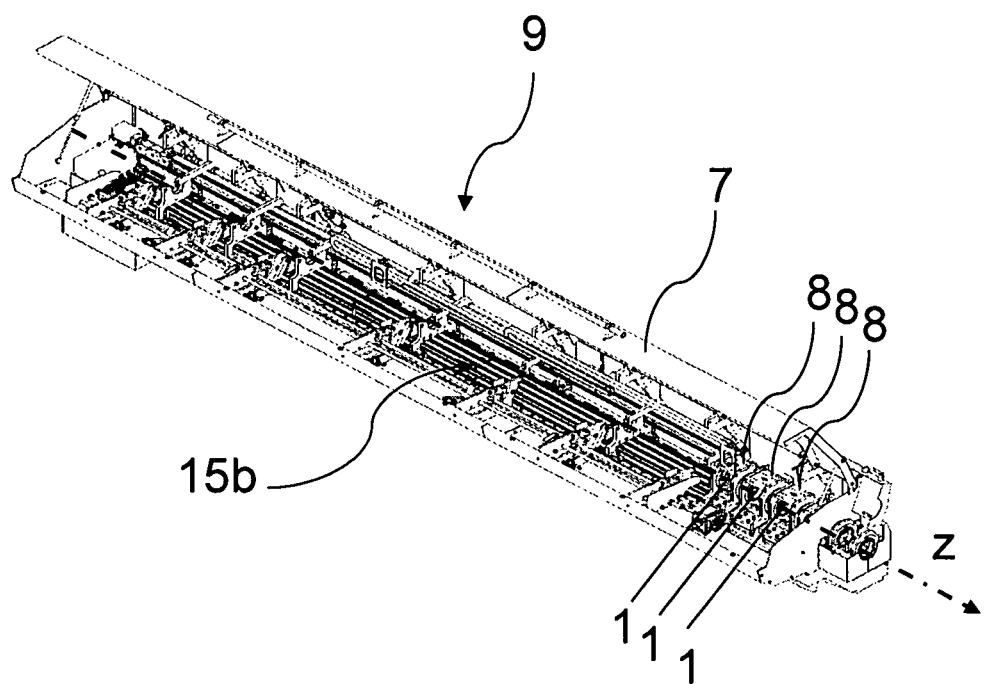
Figure 4A:
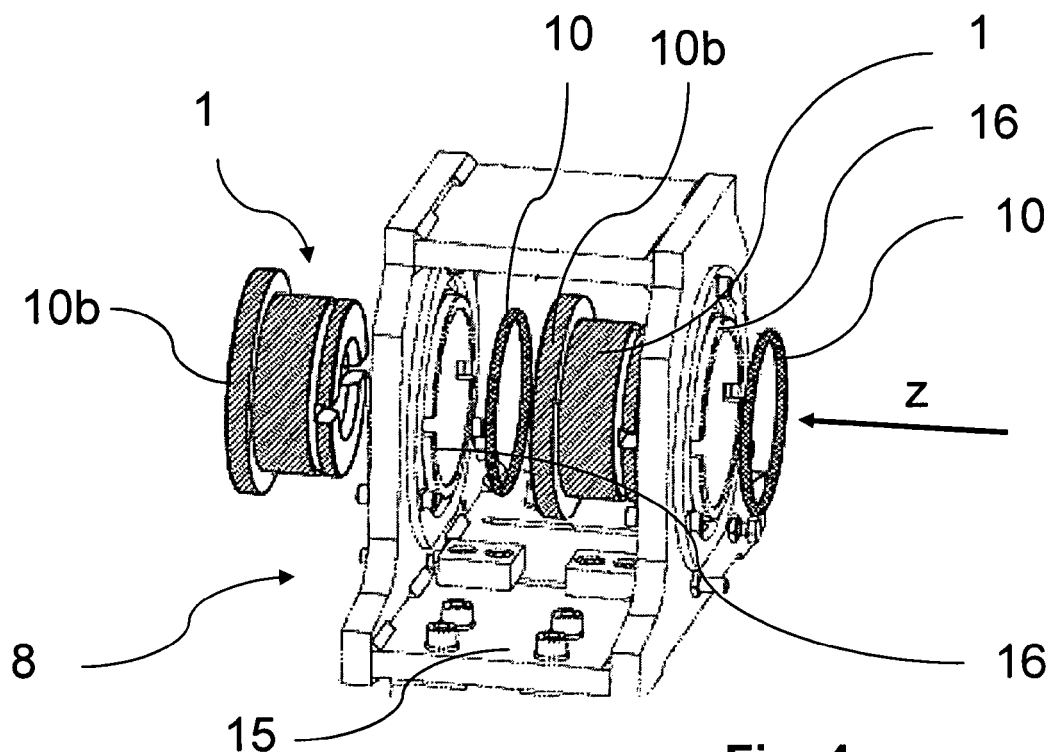
Figure 4B:
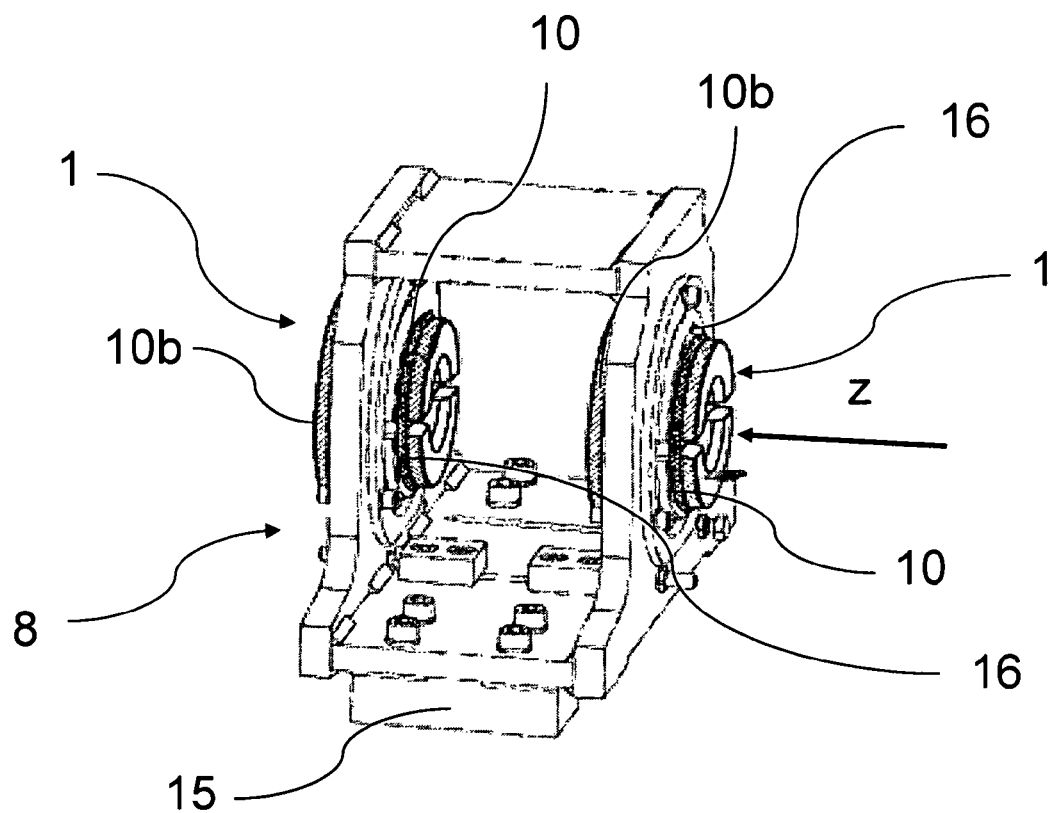
Figure 6:
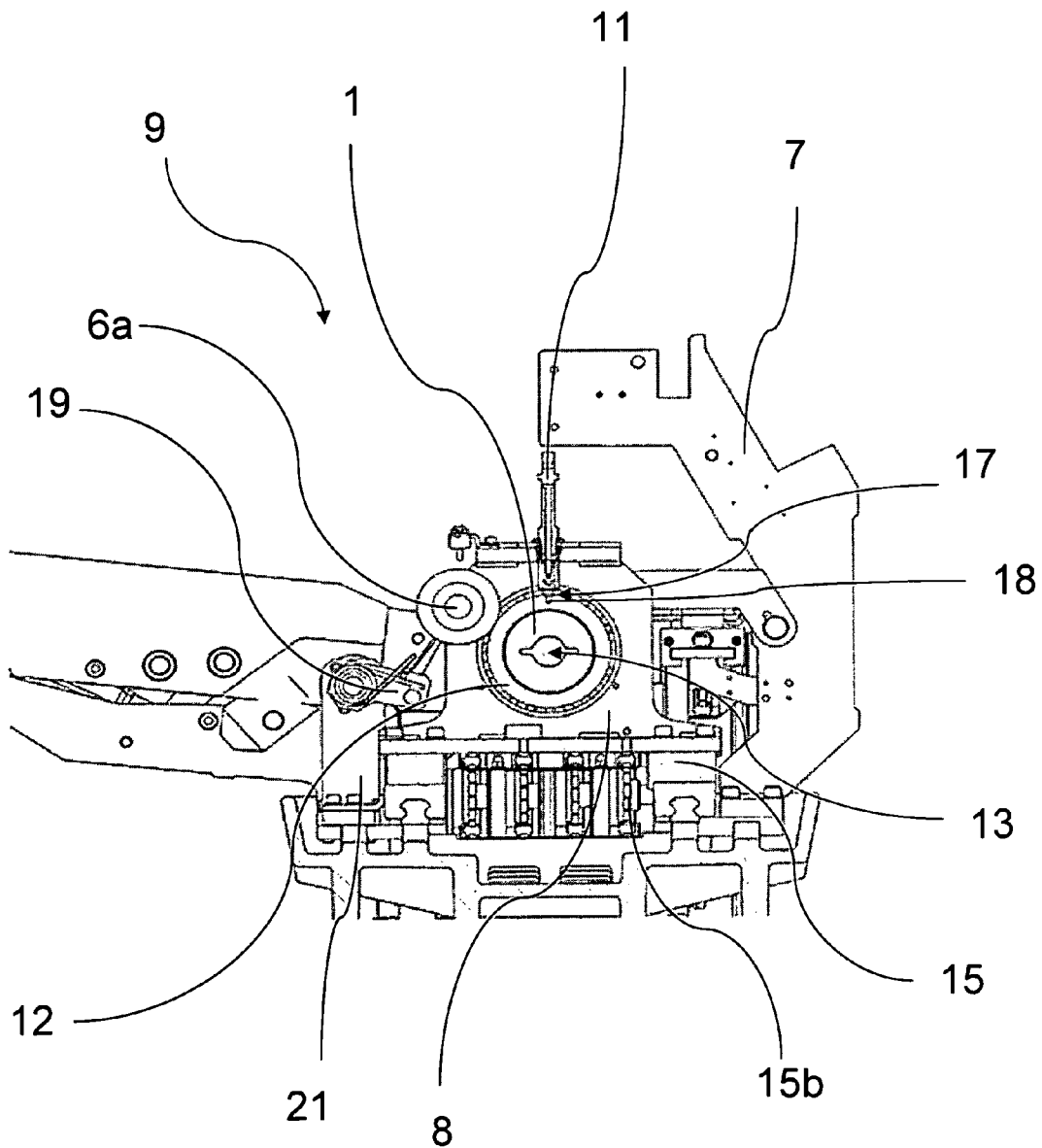
Figure 7A:
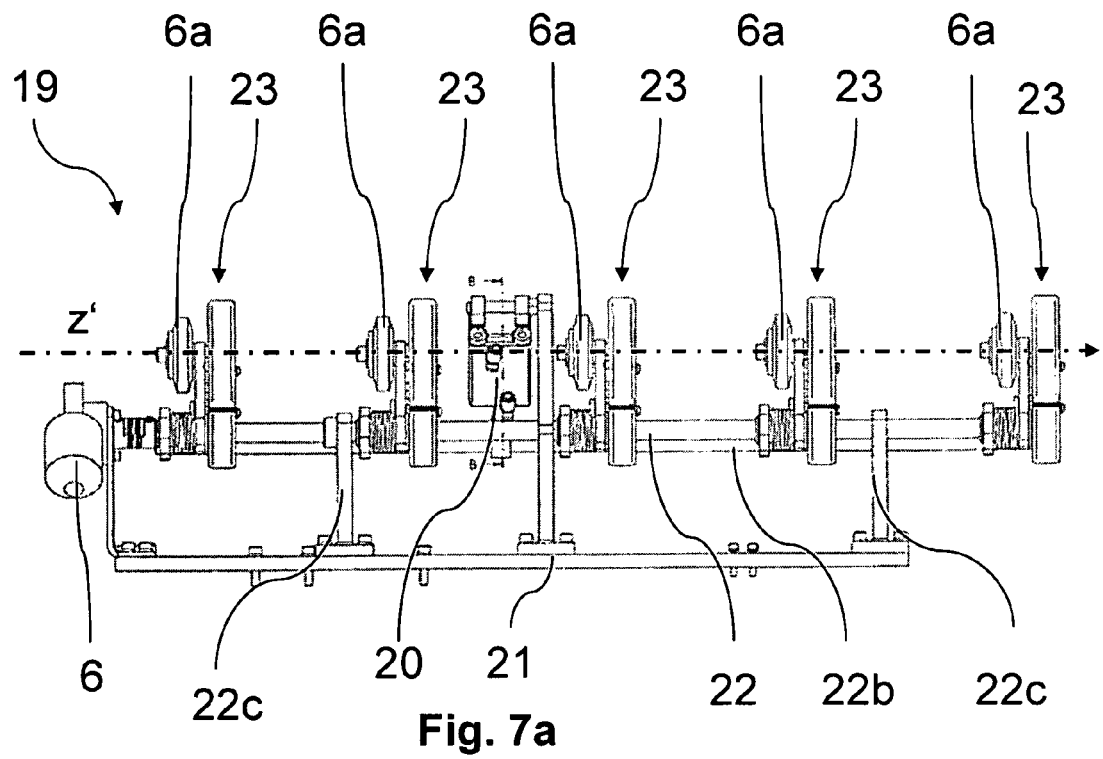
Figure 7B:
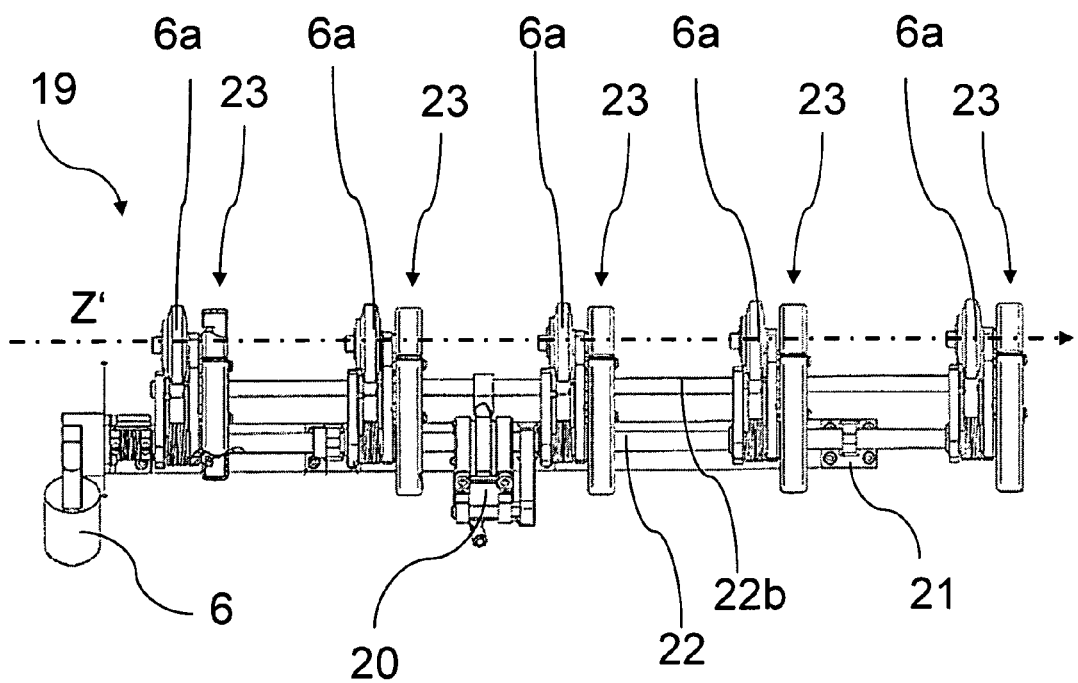
Figure 7C:
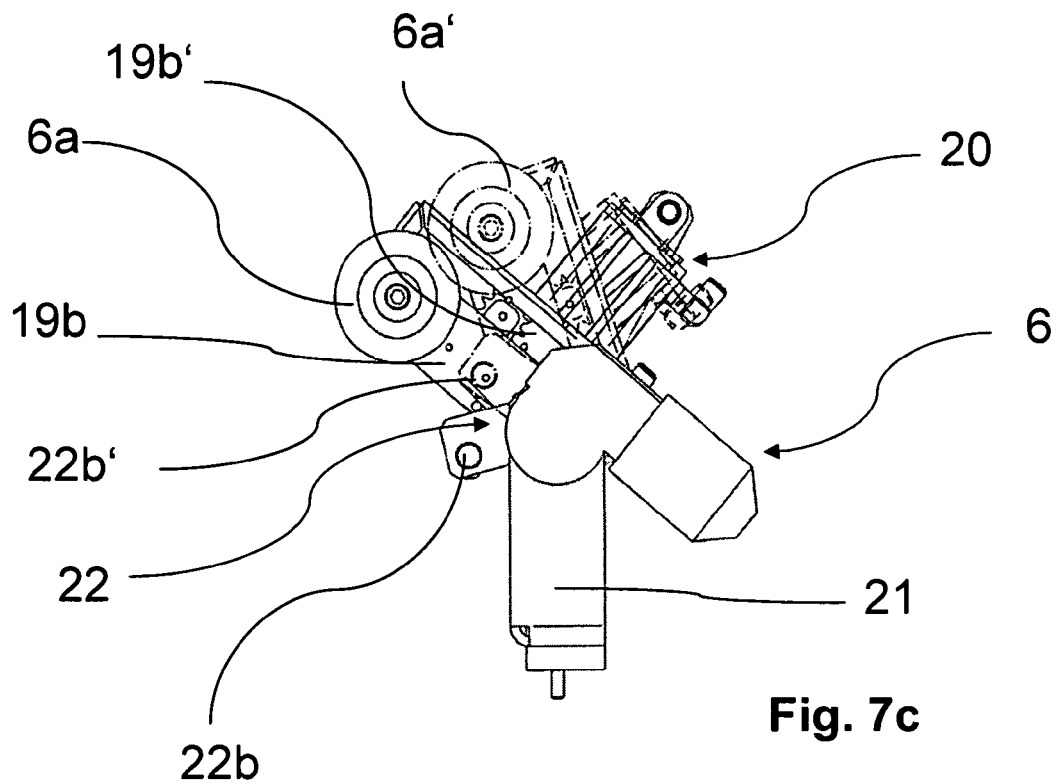
Figure 7D:
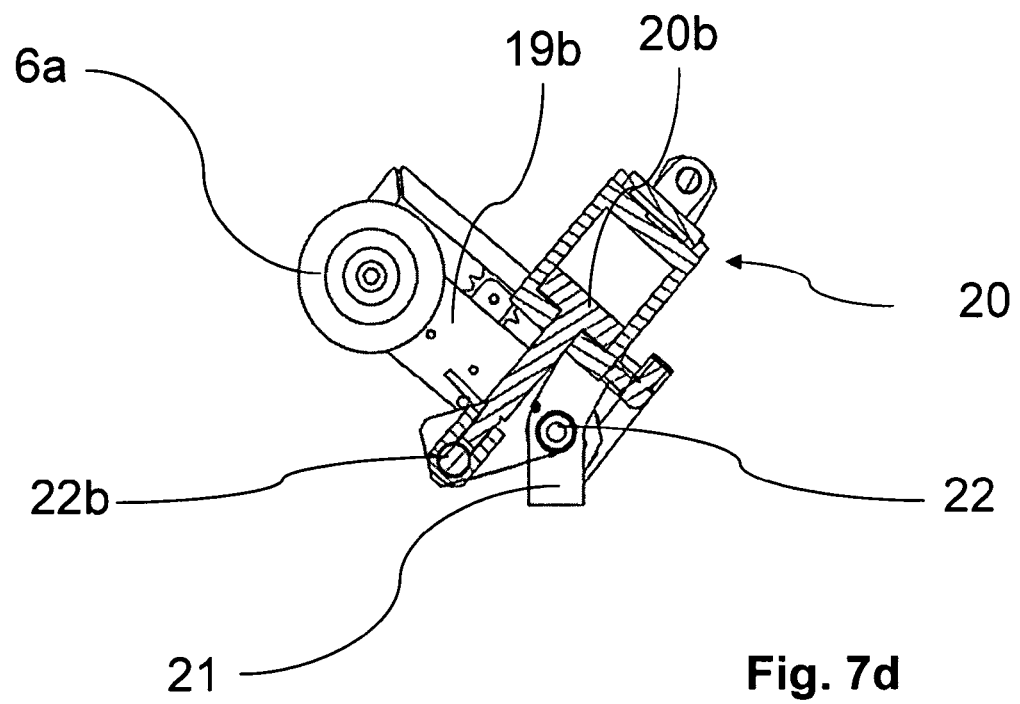
Figure 8A:
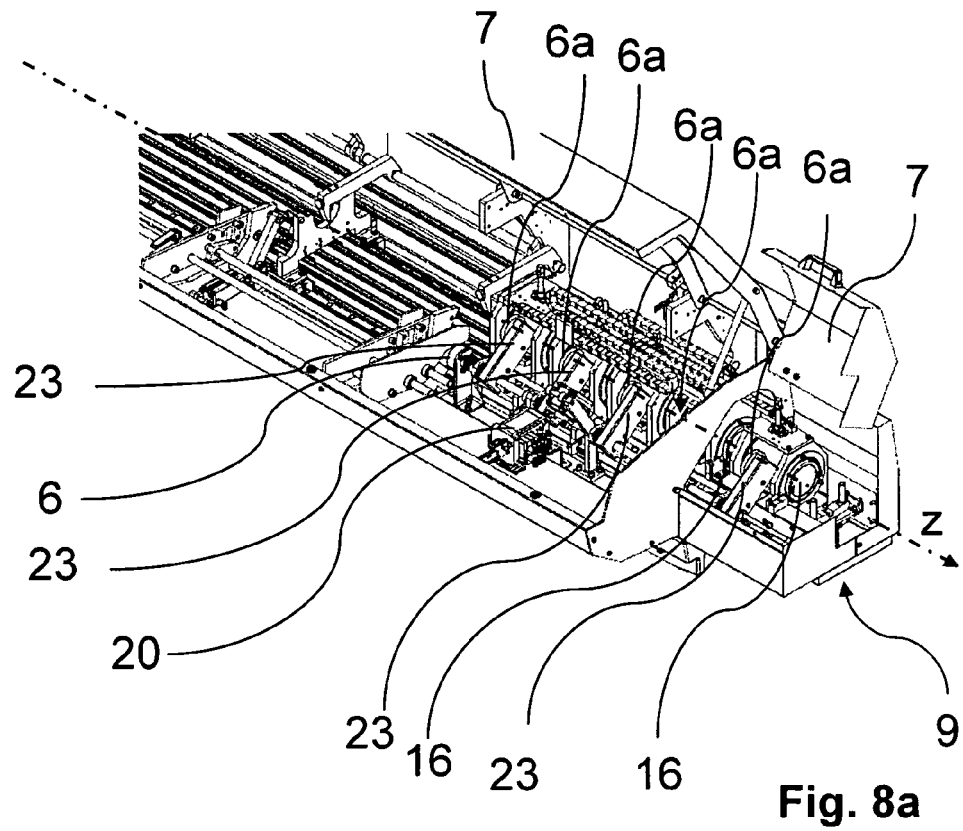
Figure 8B:
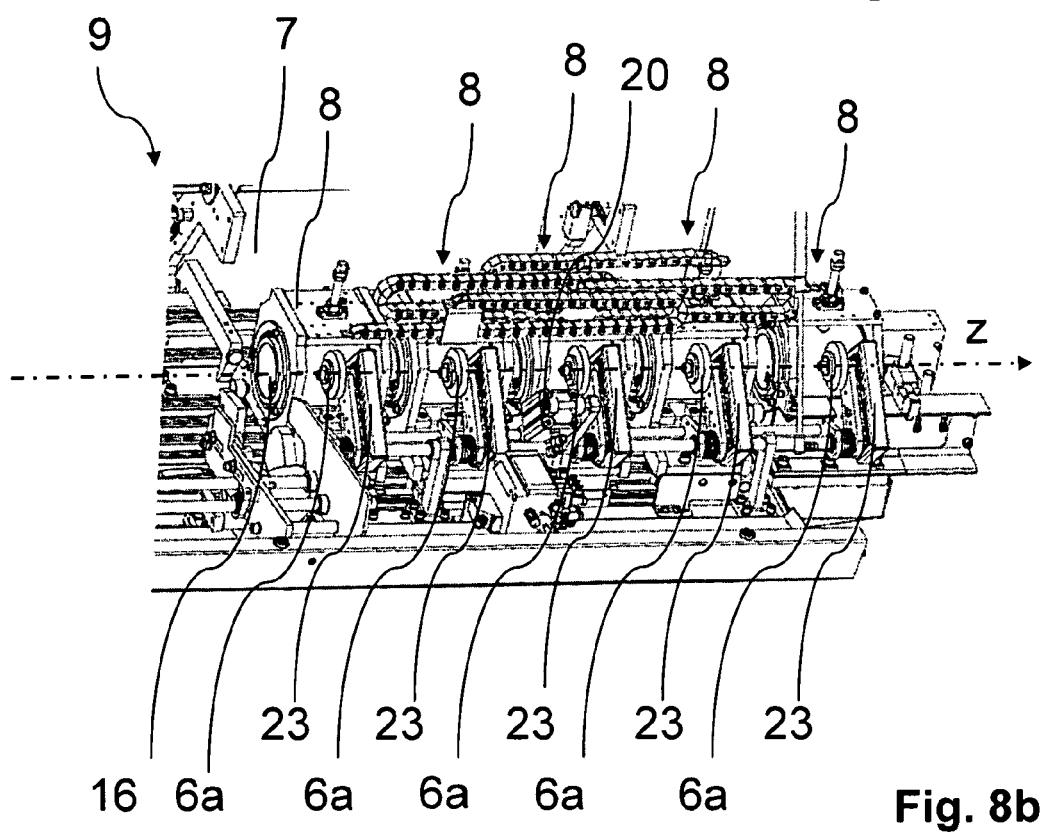

The further features as well as further attendant advantages of the invention will be apparent from the more detailed description of preferred embodiments provided below with reference to the accompanying drawings. In the drawings:

FIG. 1A: shows a schematic illustration of a material bar supported in a first bushing;

FIGS. 1B to 1C: show schematic illustrations of first bushings having centrically and eccentrically arranged profiled openings;

FIGS. 2A to 2C: show schematic illustrations of a drive means coupled to the first bushing;

FIG. 3: shows a perspective view of a bar loading magazine having bushing racks;

FIGS. 4a to 4b: show perspective views of a bushing rack comprising two bushings;

FIGS. 5a to 5d: show an alternative bushing rack comprising two bushings and a connecting tube;

FIG. 6: shows a cross-sectional view through a bar loading magazine having a bushing alignment device;

FIGS. 7a to 7b: show a pivoting device for a bushing alignment device;

FIGS. 7c to 7d: show a side view and a cross-sectional view of a pivoting device;

FIGS. 8a to 8b: show perspective views of an opened bar loading magazine having a bushing alignment device;

FIG. 9: shows a schematic illustration of a method for aligning first and second bushings;

FIGS. 10a to 10b: show schematic illustrations of a method for aligning first and second bushings in predetermined positions; and FIGS. 11a to 11b: show schematic illustrations of a method for aligning first bushings with movable drive means.

FIG. 1a shows a schematic illustration of a material bar 2, which is initially supported along a z-axis defined by the longitudinal axis of the material bar in the direction of the arrow of FIG. 1a in five first bushings 1 of a bar loading magazine and, after passing through the first bushings 1, is guided from the rear into the hollow spindle 3 of an automatic lathe. The bar loading magazine per se and the automatic lathe are not shown in FIG. 1a. A projection 5 of the material bar 2 protruding into the processing chamber of the automatic lathe is severed subsequent to the processing operation, and the material bar is continued to be pushed along the z-axis in the direction of the arrow of FIG. 1a, wherein fixation in the hollow spindle 3 is carried out by a chuck 4.

FIG. 1b shows a schematic illustration of a first bushing 1 according to FIG. 1a having a profiled opening arranged centrically with respect to the rotational axis (z') of the bushing. A non-symmetrical, profiled material bar 1 [sic] identified by hatching is centrically supported and guided in the first bushing 1, or the profiled opening of the first bushing 1. The rotational axis (z') and z-axis consequently coincide.

FIG. 1c shows a schematic illustration of a first bushing 1 according to FIG. 1a having a profiled opening arranged eccentrically with respect to the rotational axis (z') of the bushing. A cylindrical material bar 1 [sic] identified by hatching is eccentrically supported and guided in the first bushing 1, or the profiled opening of the first bushing 1. The rotational axis (z') and z-axis consequently run parallel.

FIGS. 2a to 2c show schematic cross-sectional views of first bushings 1 having different drive means 6 coupled thereto and a respective centrically supported and guided material bar 1 [sic] identified by hatching. In each case, the drive means can set the first bushings 1 into rotation in two directions of rotation. With respect to the individual figures, FIG. 2a shows a rotatorily acting drive means, which is coupled by way of a friction wheel 6a as the force transmission means to the outer face of the first bushing 1 and thereby sets the bushing into rotational motion about the rotational axis (z') thereof. FIG. 2b shows a linear drive 6b by way of example, which is tangentially coupled to the outer face of the first bushing 1. FIG. 2c shows a schematic illustration of an orbiting drive 6c, which is connected to the outer face of the bushing.

FIG. 3 shows a bar loading magazine 9 according to the prior art, into which a material bar 2 (not visible in FIG. 3) is to be placed along the z-axis for support and guidance on the automatic lathe. The bar loading magazine 9 includes a housing and a hood 7 for covering. Three bushing racks 8 are arranged in the housing of the bar loading magazine 9, which are mounted displaceably along the z-axis and movably on a chain drive 15b and can thus be positioned along the z-axis. The respective first bushings 1 within the bushing racks 8 are arranged rotatably about a rotational axis z' aligned parallel or coaxially to the z-axis, wherein the material bar is to be inserted into the first bushings 1 of the bushing racks 8.

FIGS. 4a and 4b show perspective detailed views of a single bushing rack 8 of FIG. 3, wherein FIG. 4a illustrates the individual components in detail in an exploded view and FIG. 4b illustrates the bushing racks 8 in mounted form. The bushing rack 8 has the shape of a frame with two horizontal transverse members and two vertical support members and at the lower transverse member has a chain drive attachment 15 for connection to the chain drive 15b. A first bushing 1 for inserting a material bar 2 (not shown) is placed in a ball bearing 16 in each of the two vertical support members. The first bushings 1 have profiled openings 13 (FIGS. 5a, 5b) for insertion of a material bar which are central with respect to the rotational axes of the bushings. The orifices of these profiled openings 13 are oriented in each case toward the z-axis. For axial fixation of the first bushings 1 in the ball bearings 16, each has an outer frame 10b on one side, which is seated against the axial surface of the inner ring of the ball bearing 16, while the first bushings 1 on the opposing side of a vertical support member are each secured by way of an O-ring 10, which is placed in a respective nut in the outer face of a first bushing 1. So as to rotatorily drive the first bushings 1 mounted in such a bushing rack 8, for example, a respective bushing can be coupled to a drive means 6 (not shown in FIGS. 4a and 4b) either via the cylindrical outer face of the bushing or via the cylindrical outer surface of the one-sided frame 10b by way of a respective friction wheel.

Figure 5A:
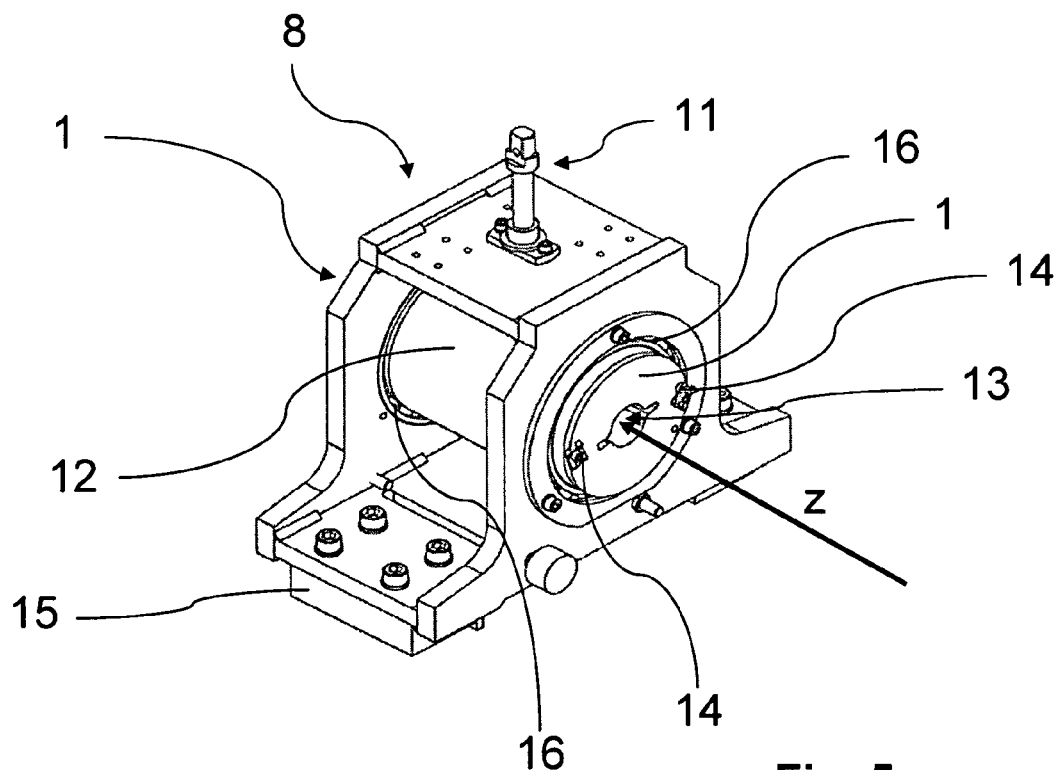
Figure 5B:
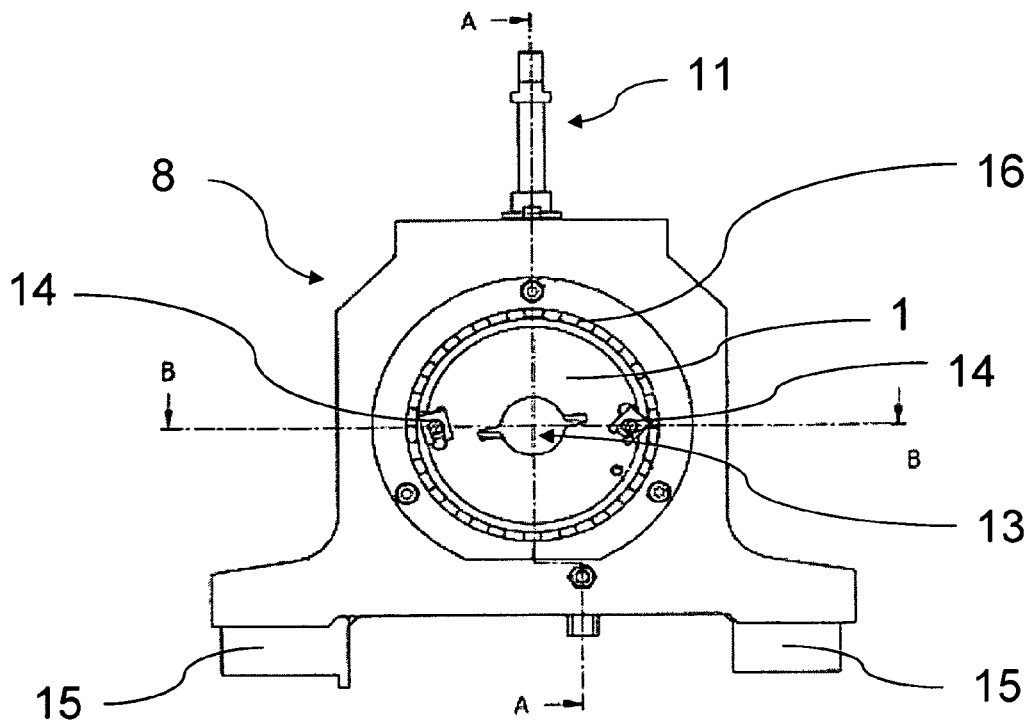
Figure 5C:
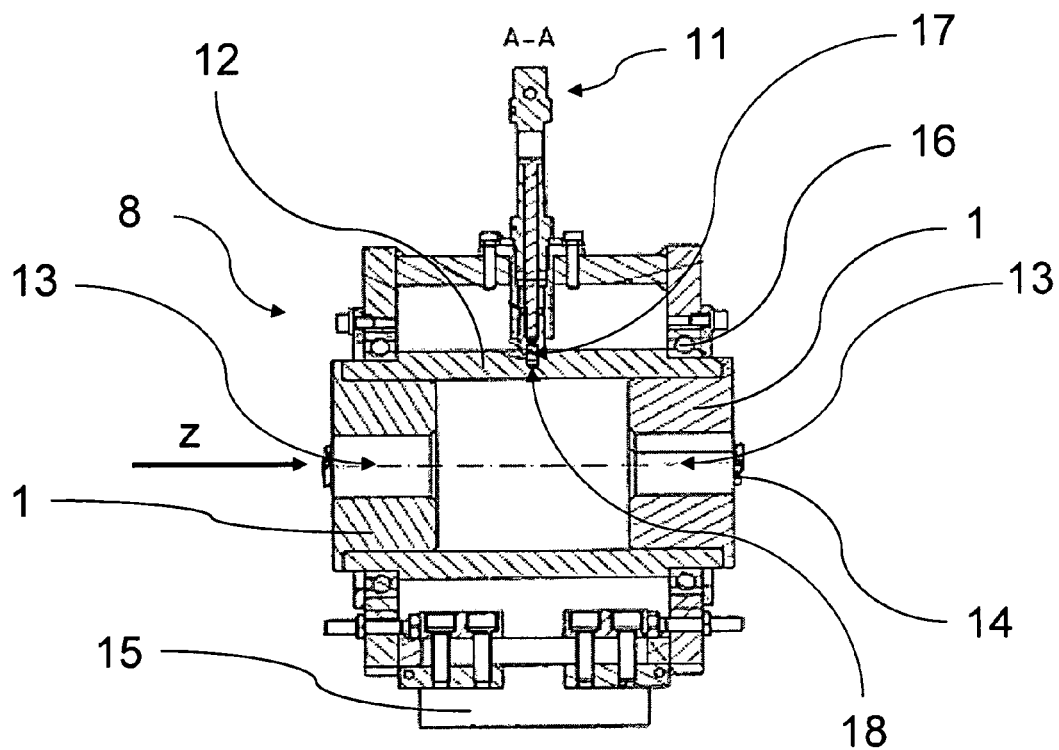
Figure 5D:
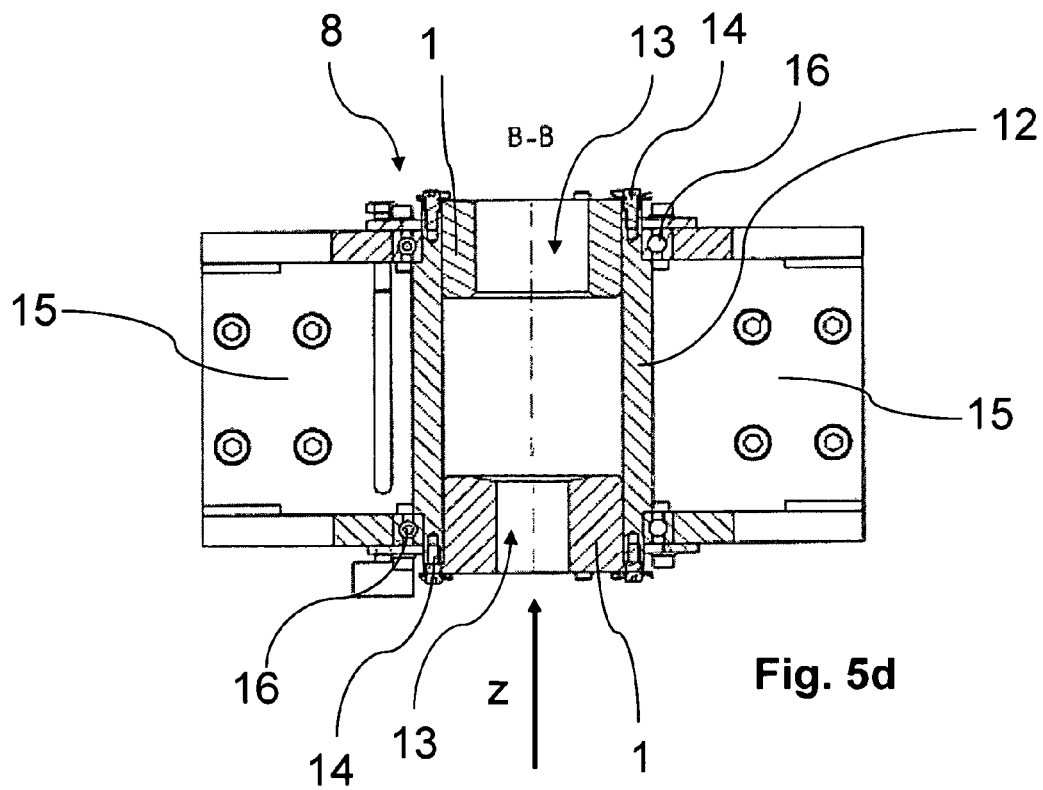

FIGS. 5a to 5d illustrate bushing racks 8 having first bushings 1 arranged therein in an alternative embodiment. FIG. 5A shows a perspective view and FIG. 5b shows a front view of a bushing rack 8 having two first bushings 1 arranged therein. FIG. 5c shows the bushing rack 8 of FIG. 5b in a horizontal section and FIG. 5d shows it in a vertical section. The bushing rack 8 likewise has the shape of a frame with two horizontal transverse members and two vertical support members and at the lower transverse member has a chain drive attachment 15 for connection to a chain drive 15b (not shown). A first bushing 1 for inserting a material bar (not shown) is placed in a ball bearing 16 in each of the two vertical support members. The first bushings 1 likewise have profiled openings 13 for insertion of a material bar which are central with respect to the rotational axes of the bushings. The orifices of these profiled openings 13 are oriented in each case toward the z-axis.

So as to couple the two first bushings 1 supported in the bushing rack 8 to a drive means 6 by way of a friction wheel 6a (neither is shown in FIGS. 5a to 5d), these bushings are axially connected to each other within the bushing rack 8 by way of a cylindrical connecting pipe 12. A friction wheel may engage on the outer cylindrical lateral surface of this connecting pipe 12. The two first bushings 1 are placed axially into the connecting pipe and are thus exchangeable.

For the purpose of axially securing the two first bushings 1, securing means 14 in the form of a receiving bolt and a securing spring are provided on both sides of the connecting pipe on the cylindrical end faces thereof and secure the first bushings 1 to prevent them from falling out of the inner pipe. For the purpose of securing to prevent rotation about the z-axis of the first bushings 1, these are preferably connected to the connecting pipe 12 either by positive fit or are connected thereto by way of entrainment means. FIGS. 5*a* and 5*b* further show a holding means 11 arranged on the bushing rack 8.

FIG. 5*c* shows such a holding means 11 arranged on the bushing rack 8, the holding means being able to engage in a receiving portion 18, acting as a position detector 11*b*, in the outer lateral surface of the connecting pipe 12 by way of an engaging means 17 and thereby retain the two first bushings 1 in predetermined rotational positions for mutual flush alignment. The holding means is pneumatically operated and may also be pneumatically released.

FIG. 6 shows a vertical section through a bar loading magazine 9 having a bushing alignment device arranged therein and having a bushing rack 8 according to FIGS. 5*a* to 5*d*, which is mounted to a chain drive 15*b* of the bar loading magazine 9 by way of a chain drive attachment 15. A friction wheel 6*a* is coupled to the outer lateral surface of the connecting pipe 12, so that the two first bushings 1 arranged in the bushing rack within the connecting pipe 12 can be driven about the z-axis, which protrudes from the drawing plane, and thus the rotational positions of the profiled openings 13 of the two first bushings 1 (in FIG. 6 only one first bushing is visible) can be aligned.

So as to couple the friction wheel 6*a* to, and decouple it from, the two first bushings 1 or the connecting pipe 12 thereof, a pivoting device 19 is provided, which is attached in the housing of the bar loading magazine 9 by way of a base plate 12. The friction wheel is attached rotatably to a pivot arm (not shown in FIG. 6) for this purpose.

A pivoting device 19 of FIG. 6 is shown in detailed views in FIGS. 7*a* and 7*b*. FIG. 7*a* shows a side view of, and FIG. 7*b* shows a top view onto, the pivoting device 19. The pivoting device 19 comprises a base plate 21 for attachment in the bar loading magazine 19 (not shown). The pivoting device 19 comprises five friction wheels 6*a*, which are arranged along the rotational axis z', and can thus directly drive five first bushings 1 or be used for directly driving five bushing units. The friction wheels 6*a* are rotatorily driven by chain drives 23, respectively, which are not visible in FIGS. 7*a* and 7*b* because they are covered by protective coverings. The friction wheels 6*a* are driven by a central drive means 6, which is provided on the left side of the pivoting device 19. For force transmission of the drive means 6 to the chain drives 23, a drive shaft 22 connected to the drive means 6 is arranged on the pivoting device 19 along the rotational axis z', the drive shaft being mounted in bearing brackets 22*c* connected to the base plate 21.

The pivoting device comprises a positioning drive 20, which is mounted on a centrally arranged bearing bracket 22*c*. FIGS. 7*c* and 7*d* show detailed views of this positioning drive 20, wherein FIG. 7*c* illustrates a side view and FIG. 7*d* illustrates a vertical section through the positioning drive 20 of the pivoting device 19 of FIGS. 7*a* and 7*b*. The positioning drive comprises a cylinder drive 20*b*, which expediently can be electrically or pneumatically operated. This cylinder drive is supported against a support shaft 23, which mechanically connects the pivot arms 19*b* in which the friction wheels 6*a* are mounted (FIG. 7*d*). During operation of the cylinder drive 20*b*, the pivot arms 19*b*' mounted in the drive shaft 22 as well as the friction wheels 6*a*' are thus pivoted about the drive shaft 22 (FIG. 7*c*).

FIGS. 8*a* and 8*b* show perspective views of a bushing alignment device in an opened bar loading magazine 9. This magazine has a cover hood 7. No material bar 2 to be inserted in a z-direction is shown in the bar loading magazine 9, and no first bushings 1 are placed in the ball bearings 16. FIGS. 8*a* to 8*b* show five bushing units 8 according to FIGS. 5*a* to 5*d*, which can be positioned, which is to say displaced, along the z-axis by way of a chain drive 15*b*. Friction wheels 6*a* engage on the lateral surfaces of the connecting pipes 12 (not shown) of these bushing units (FIG. 8*b*).

FIG. 9 shows a highly schematic illustration of a method for aligning bushings, which is carried out by way of the above-described bushing alignment device according to the invention and, in a first step, comprises the rotatory driving of a first bushing 1 by the drive means 6. In a second, subsequent step, the first bushing 1 is coupled to a second bushing 24 by the friction-fit and/or positive-fit entrainment of the first bushing 1 in a predetermined rotational position, whereby the second bushing 24 is then likewise driven rotatorily. In an alternative embodiment of the invention, further second bushings 24 can be coupled to each other by entrainment means and brought into the predetermined rotational positions.

When the first and second bushings have been set into rotational motion, the material bar is guided axially along the z-axis close toward the first bushing, wherein the first bushing is either retained by a holding means in a predetermined rotational position, or the material bar 2 is placed against the end face of the first bushing 1 and axial pressure is applied to the material bar 2, while the first and second bushings continue to be maintained in a slow rotational motion, so that the material bar can slide into the profiled opening 13 (not shown) of the first bushing 1 when the predetermined rotational position has been reached.

When the bushing, either by way of the holding means or by the slow rotational motion, has reached a predetermined rotational position, in which the first bushing 1 or the profiled opening 13 thereof is aligned flush with the cross-sectional profile of the material bar and the material bar can slide into the first bushing, the material bar 2 is axially inserted into the first and second bushings 1 and 24 along the z-axis, and the material bar is introduced from the rear, with respect to all bushings, into the hollow spindle 3 of the automatic lathe and is fixed by way of a chuck 4.

FIGS. 10*a* and 10*b* are schematic illustrations of a further advantageous method of the invention for aligning first bushings in a bar loading magazine, which can likewise be carried out by way of the above-described bushing alignment device according to the invention. To this end, a material bar 2 that in one operating state is supported and guided in five first bushings 1 is shown in FIG. 10*a*, which is inserted from the rear, with respect to all bushings, into the spindle 3 of an automatic lathe (not shown), and a projection 5 of the material bar 2 protruding into the processing chamber of the automatic lathe, which is not shown, is fixed by a chuck 4.

The material bar 2 is supported and guided in the first bushings 1 along the z-axis at uniform distances, wherein the first bushings 1 are arranged movably, which is to say displaceably, along the z-axis. Because the processed projection 5 of the material bar 2 is severed after the processing operation in the processing chamber of the automatic lathe, and the material bar continues to be fed along the z-axis into the automatic lathe for further processing, the material bar 2 becomes steadily shorter during the processing operation, wherein the first bushings 1 expediently can likewise continue to be guided along the z-axis by the control unit of the automatic lathe and/or of the bar loading magazine, so that as uniform a distance between the first bushings is maintained and all the bushings are used to continue to guide the material bar for as long as possible.

FIG. 10*b* shows a schematic illustration of a final state of a processing operation of the material bar 2 to be processed with respect to the support and guidance thereof, wherein all five first bushings are seated next to each other at the end faces thereof. In this longitudinal position of the first bushings, fixed drive means 6 for rotatorily driving the first bushings 1 are arranged vertically above the outer faces of the bushings with respect to the z-axis and can thus be coupled to the first bushings 1 for rotatorily driving the same. The first bushings 1 can thus be accordingly aligned with the cross-sectional profile of a further material bar 2' to be inserted and guided in the bar loading magazine, so that this bar can be processed directly, which is to say without any significant time delay, and continuous material flow in the bar loading magazine or in the automatic lathe is made possible.

FIGS. 11*a* and 11*b* are schematic illustrations of an alternative advantageous method of the invention for aligning first bushings in a bar loading magazine, which can likewise be carried out by way of the above-described bushing alignment device according to the invention. Contrary to the method shown in FIGS. 10*a* and 10*b*, in this method the drive means 6 can be displaced together with the first bushings 1 along the z-axis and are carried along by the first bushings 1 by way of the control unit.

In a further alternative method, contrary to the methods described in FIGS. 10*a* to 11*b*, the material bar 2 can be supported and guided both at least in one first bushing 1 and in a second bushing 24. For the purpose of rotary driving, in such a case it may expediently be provided that only the first bushings 1 are associated with a drive means 6, while the second bushing 24 in this method is axially coupled to the first bushing 1 by an entrainment means, which is arranged on the first and/or second bushings 24, so that the second bushing 24 can likewise be set in rotational motion and is aligned in a predetermined rotational position.

LIST OF REFERENCE NUMERALS 1 first bushing
2, 2' material bar
3 spindle of the automatic lathe
4 chuck
5 projection
6 drive means
6*a* friction wheel
6*b* linear drive
6*c* orbiting drive
7 hood
8 bushing rack
9 bar loading magazine
10 O-ring
10*b* frame
11 holding unit
11*b* position detector
12 connecting pipe
13 profiled opening
14 securing means
15 chain drive attachment
15*b* chain drive
16 ball bearing
17 engaging means
18 receiving portion
19 pivoting device
19*b* pivot arm
20*b* cylinder drive
20 positioning drive
21 base plate
22 drive shaft
22*b* support shaft
22*c* bearing bracket
23 chain drive
24 second bushing
z z-axis
z' rotational axis

The invention claimed is:

1. A bushing alignment device of a bar loading magazine for guiding material bars on an automatic lathe,
   wherein a z-axis (z) is defined by the longitudinal axis of a material bar guided in the bar loading magazine, and
   wherein a plurality of first bushings, which can be moved along the z-axis (z) and into which the material bar is to be inserted along the z-axis (z) for processing in the automatic lathe, are arranged in the bar loading magazine,
   wherein a first rotational axis, which is arranged either coaxially or parallel to the z-axis (z) and about which the first bushings are rotatably mounted, extends through the first bushings,
   wherein alignment between the first bushings and a cross-sectional profile of the material for inserting the material bar at a predetermined rotational position is achieved by one or more of:
   (i) one or more friction wheels as drive means, which for force transmission can be selectively coupled to the first bushings or decoupled therefrom by a pivoting device, to which the drive means are attached and which can be pivoted toward the first bushings for coupling thereto, and wherein the first bushings can be coupled to the drive means in a friction-fit manner and are driven by a linear motor, by a rotatorily acting motor and/or by an actuator motor, for rotatorily driving the first bushings about the first rotational axis to the predetermined rotational position, and
   (ii) one or more holding units, which are adapted to selectively retain the first bushings in the predetermined rotational position.

2. The bushing alignment device according to claim 1, further comprising:
   a position detector arranged on the first bushing for detecting the predetermined rotational position, the position detector cooperating with the one or more holding units,
   wherein the position detector comprises at least one of:
   (a) receiving portions arranged on the first bushings and configured to receive an engaging means arranged in the bar loading magazine, and
   (b) an optically or electronically detectable coding arranged on the first bushings, wherein the bushing alignment device further comprises an evaluation unit for evaluating the coding.

3. A bushing alignment device according to claim 1, wherein the drive means comprise a clutch, which is automatically switched as a function of the torque.

4. A bushing alignment device according to claim 1, wherein the drive means can be moved along the z-axis (z).

5. A bushing alignment device according to claim 1,
wherein a second bushing is arranged movably along the z-axis (z) in the bar loading magazine, and wherein a second rotational axis, which is arranged either coaxially or parallel to the z-axis (z) and about which the second bushing is rotatably mounted, extends through the second bushing, and wherein the material bar is to be inserted into the second bushing along the z-axis (z), wherein the first and second bushings have entrainment means designed in complementary manner to each other, in particular in the form of friction surfaces and/or magnetically acting surfaces and/or an engaging means and a receiving portion, so that the first and second bushings can be coupled to each other with friction fit and/or positive fit in such a way that a rotation of the first bushing causes the second bushing to be entrained.

6. The method for aligning bushings by way of a bushing alignment device according to claim 5, comprising the following steps:
 a1) rotatorily driving the first bushing by the drive means; and
 b) inserting the material bar into the first bushing along the z-axis.

7. The method according to claim 6, wherein after step a1) and prior to step b),
 a2) coupling the first bushing to at least a second bushing in a friction-fit and/or positive-fit manner is carried out,
 and in step b): the material bar is additionally inserted into the second bushing along the z-axis (z).

8. The method according to claim 6, wherein prior to step b), the first bushing and/or the second bushing is retained in a predetermined rotational position for the mutual flush alignment with respect to the cross-sectional profile of the material bar.

9. A method for aligning bushings by way of a bushing alignment device according to claim 1, comprising the following steps:
 a1) rotatorily driving the first bushings by the drive means; and
 b) inserting the material bar into the first bushings along the z-axis,
 wherein prior to inserting the material bar, the first bushings are retained in a predetermined rotational position for the mutual flush alignment with respect to the cross-sectional profile of the material bar.

10. A bushing alignment device of a bar loading magazine for guiding material bars on an automatic lathe,
 wherein a z-axis (z) is defined by the longitudinal axis of a material bar that is guided in the bar loading device, and wherein a first bushing, into which the material bar is to be inserted along the z-axis (z) for the processing thereof in the automatic lathe, is arranged in the bar loading magazine, wherein a first rotational axis, which is arranged either coaxially or parallel to the z-axis (z) and about which the first bushing is rotatably mounted, extends through the first bushing, and wherein at least one drive means is included, which is coupled to the first bushing, for rotatorily driving the first bushing about the first rotational axis in such a way that the first bushing and a cross-sectional profile of the material bar can be aligned flush with each other for inserting the material bar, wherein a second bushing is arranged movably along the z-axis (z) in the bar loading magazine, and wherein a second rotational axis, which is arranged either coaxially or parallel to the z-axis (z) and about which the second bushing is rotatably mounted, extends through the second bushing, and wherein the material bar is to be inserted into the second bushing along the z-axis (z), wherein the first and second bushings have entrainment means designed in complementary manner to each other, in the form of friction surfaces and/or magnetically acting surfaces and/or an engaging means and a receiving portion, so that the first and second bushings are coupled to each other with friction fit and/or positive fit in such a way that a rotation of the first bushing causes the second bushing to be entrained.

11. The method for aligning bushings by way of a bushing alignment device according to claim 10, comprising the following steps:
 a1) rotatorily driving the first bushing by the drive means; and
 b) inserting the material bar into the first bushing along the z-axis.

12. The method according to claim 11, wherein after step a1) and prior to step b), the following step:
 a2) coupling the first bushing to at least a second bushing in a friction-fit and/or positive-fit manner is carried out,
 and in step b): the material bar is additionally inserted into the second bushing along the z-axis (z).

13. The method according to claim 11, wherein prior to inserting the material bar, the first bushing and/or the second bushing is retained in a predetermined rotational position for the mutual flush alignment with respect to the cross-sectional profile of the material bar.

* * * * *